United States Patent [19]

Schultz

[11] 4,273,003
[45] Jun. 16, 1981

[54] CHECK VALVE BEARING LUBRICATOR

[76] Inventor: Donald C. Schultz, 404 Northdale Dr., Toledo, Ohio 43612

[21] Appl. No.: 19,809

[22] Filed: Mar. 12, 1979

[51] Int. Cl.³ .................... F01M 9/10; F16H 57/04
[52] U.S. Cl. ................................. 74/467; 184/6.12
[58] Field of Search .................. 137/454.2; 184/6.12; 251/368; 418/188, 196; 74/467, 468

[56] References Cited

U.S. PATENT DOCUMENTS

| 248,902 | 11/1881 | Whitman | 137/454.2 |
|---|---|---|---|
| 1,502,083 | 7/1924 | Zoelly | 74/468 |
| 1,893,640 | 1/1933 | Ahlm | 184/6.12 X |
| 2,051,914 | 8/1936 | Svenson | 74/462 |
| 2,053,542 | 9/1936 | Vandervoort | 184/6.12 X |
| 3,123,012 | 3/1964 | Gilreath | 418/196 X |
| 3,131,582 | 5/1964 | Kelbel | 74/467 X |
| 3,259,073 | 7/1966 | Burtis | 418/196 X |
| 3,729,022 | 4/1973 | Roach | 251/368 X |
| 4,106,361 | 8/1978 | Burtis | 74/462 |

FOREIGN PATENT DOCUMENTS 567679  7/1973  Switzerland ...................... 74/468

Primary Examiner—Lawrence J. Staab
Attorney, Agent, or Firm—Frank B. McDonald

[57] ABSTRACT

A check valve provides improved lubrication of a bearing contained within a gear. The check valve is positioned within a bore in the gear, the bore extending radially inwardly from the gear teeth to the bearing. In a preferred embodiment, a ball check valve is contained in a transmission drive gear, the gear containing a pocket bearing. The ball of the check valve is held against the check valve seat by centrifugal force created by the rotation of the drive gear. As the drive gear teeth mesh with those of a countershaft gear, pulses of transmission oil are forced into the bore, intermittently unseating the ball against centrifugal force to provide a continuous supply of oil to the pocket bearing.

10 Claims, 4 Drawing Figures

CHECK VALVE BEARING LUBRICATOR

TECHNICAL FIELD

This invention relates to bearing lubrication, and more particularly to the lubrication of transmission pocket bearings.

BACKGROUND ART

In a standard transmission, a mainshaft is journalled within an input shaft via a pocket bearing. The latter bearing has been traditionally difficult to lubricate because of its relatively concealed position within a bore in the end of the input shaft.

Conventional devices for providing pocket bearing lubrication have included port holes, grease packs, oil slingers, and hydraulic pumps. Port holes generally are machined radially through transmission input shafts for ducting oil inwardly to pocket bearings. Grease packs are simply large masses of grease in which pocket bearings are packed during assembly of transmissions. Oil slingers and hydraulic pumps involve mechanical pumping actions for providing forced oil flow to pocket bearings.

Port holes have been found deficient in high speed lubrication of transmission input shafts because oil travels inwardly to the pocket bearings only during slow rotation or stoppage of the shaft. At high rotation speeds, centrifugal force throws the oil outwardly rather than inwardly through the port holes, thus starving the bearing at high speeds when lubrication becomes more critical.

Grease packs have been successful at low speeds and under low loading conditions. However, under increased speed and loading conditions grease packs deteriorate rapidly and are, therefore, unsuitable for long-term bearing lubrication.

Operationally, oil slingers and hydraulic pumps have been more successful than port holes and grease packs. However, slingers have tended to be less efficient in the high speed-high load conditions of today's heavy duty transmissions and most hydraulic pumps are generally considered too complex and expensive as a feasible alternative.

DISCLOSURE OF THE INVENTION

The invention dislcosed and claimed herein provides a relatively inexpensive, but very effective, bearing lubrication system. In a gear containing a bearing, a check valve is positioned within a bore of the gear. The bore extends from the gear teeth radially inwardly to the bearing, wherein oil forced into the bore may be held therein by the check valve against the centrifugal force of the gear's rotation to ensure a continuous oil supply to the bearing. A preferred embodiment of the invention is incorporated in a twin-countershaft transmission having an input shaft which includes an integral drive gear at an end thereof. A mainshaft is journalled in a pocket bearing contained within the drive gear. As the drive gear meshes with the countershaft gears, oil is forced into a radial bore in the drive gear, the bore extending inwardly from the gear teeth of the drive gear to the pocket bearing. The bore contains a ball check valve which is defined by a ball within a housing, the latter containing a seat at one end, and at least one ball retainer tang at the other. As the gear rotates, the ball is urged against the seat by centrifugal force, and for each rotation of the drive gear, two pulses of oil (one for each countershaft gear) are forced into the bore, intermittently unseating the ball. Successive pulses of oil are thereby trapped in the bore thus creating a continuous oil supply to the pocket bearing.

DETAILED DESCRIPTION OF A PREFERRRED EMBODIMENT

Figure 1:
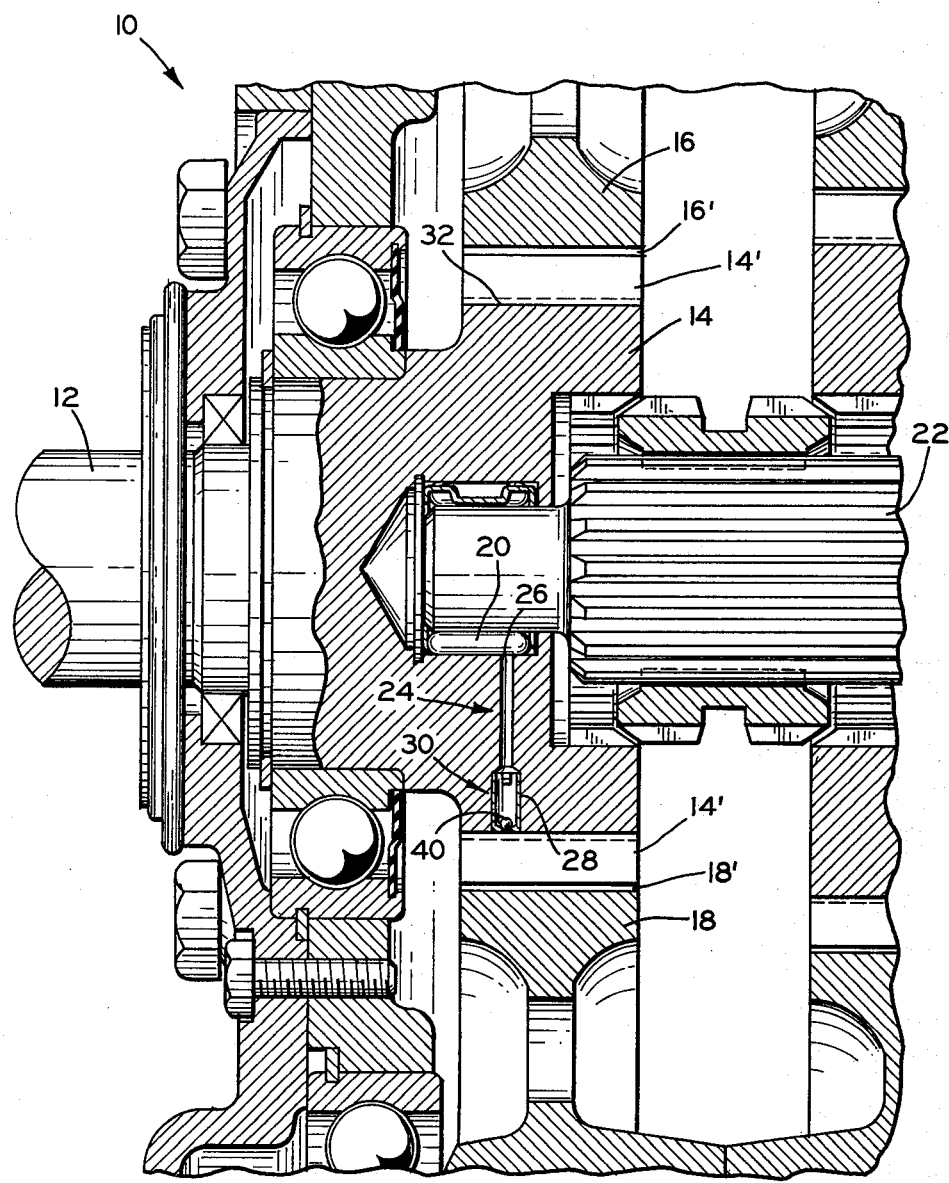
FIG. 1 is a fragmented sectional top view of a twin-countershaft transmission containing a preferred embodiment of the ball check valve pocket bearing lubricator of this invention.

The transmission 10 of FIG. 1 includes an input shaft 12 which has an integral annular drive gear 14. The drive gear 14 is in constant mesh with countershaft gears 16 and 18. A pocket bearing 20 is contained within the drive gear 14 for supporting a mainshaft 22 journalled therein. The drive gear 14 contains a compound bore 24 which extends radially inwardly from the gear teeth 32 of the drive gear 14 to the pocket bearing 20. The bore includes two radially in-line contiguous sections 26 and 28. Section 28 is positioned radially outwardly of section 26, has a larger diameter than section 26, and contains a ball check valve 30. Although in the preferred embodiment, section 28 has a larger diameter than section 26, this condition is not a fixed requirement for operability of this invention; rather, it is for the simple convenience of providing a fixed locator for installation of the valve housing.

Figure 2:
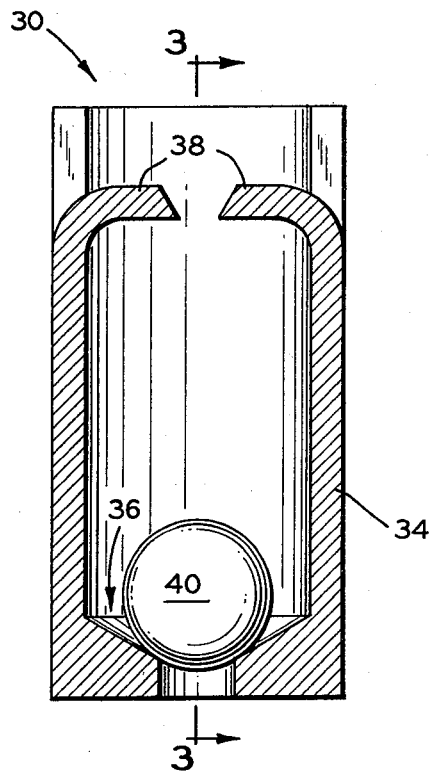
FIG. 2 is a sectional elevation of the ball check valve of FIG. 1.
Figure 3:
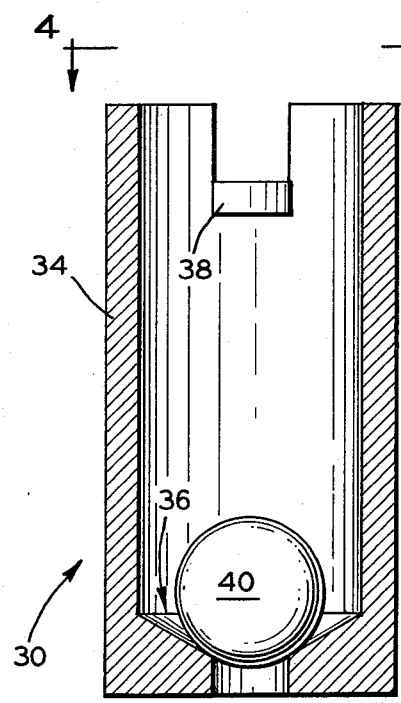
FIG. 3 is a view along line 3—3 of FIG. 2.
Figure 4:
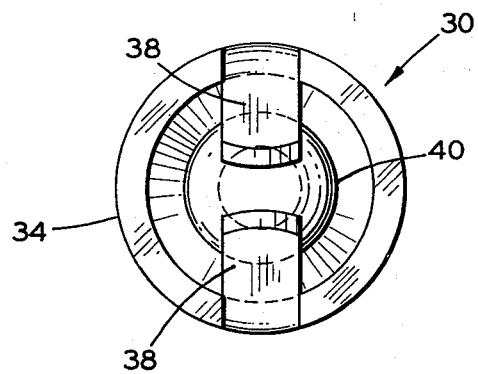
FIG. 4 is a view along line 4—4 of FIG. 3.

FIGS. 2–4 depict the ball check valve 30 of this invention. The valve includes a ball valve housing 34 having a ball valve seat 36 in one end thereof. In the opposite end, two retension tangs 38 are provided. A ball 40 is contained within the housing 34, and as particularly apparent in FIG. 2, the ball is restricted from escaping the housing ends by virtue of the valve seat 36 and the tangs 38, respectively.

The ball 40 is preferably made of ceramic (1) in order to have a mass which is light enough to be unseated by the pulses of oil generated by the meshing of drive and countershaft gear teeth (vis-a-vis steel), and (2) in order to withstand the operating temperatures encountered (vis-a-vis teflon). With respect to the mass of the ball 40, practical limitations dictate that the hole 42 through the ball valve seat 36 be at least seventy one-thousandths (70/1000) of an inch in diameter in order to avoid plugging thereof. Steel balls were found unworkable because at the required ball diameters, the oil pulses created by the meshing teeth (at speeds up to 3000 R.P.M.) were inadequate to unseat the steel balls. The operating temperatures of transmission gear teeth surfaces under adverse conditions (hill climbing during low oil levels) ranged between 700° F. and 800° F. Experimental teflon balls melted under the latter conditions, while ceramic balls successfully withstood the heat.

Proper installation of the ball check valve 30 in the drive gear 14 is as depicted in FIG. 1; the valve must be inserted into the compound bore section 28 with the tangs 38 first entering the section. A relatively tight press fit is required to withstand the centrifugal force on the valve 30 produced by the rotating drive gear 14.

In operation, the ball 40 is held against its seat by the aforementioned centrifugal force. As the drive gear teeth 14' mesh with respective countershaft gear teeth 16' and 18', intermittent pulses of oil unseat the ball 40, such pulses of oil once admitted becoming trapped within the housing 34 and bore section 26. A continuous oil supply is thereby created for the pocket bearing 20.

Although the preferred embodiment herein disclosed relates to transmissions, it is apparent that the scope of this invention may be embodied in other gearbox designs which include a gear in mesh with at least one other gear, e.g. power take-offs, transfer cases, etc.

Having thus described the preferred embodiment of the invention, what is claimed is:

1. In a gear having a bearing surface contained therein for rotatable mounting thereof, the gear including a bore extending radially from gear teeth thereon to said bearing surface; a bearing lubricator within said gear comprising said bore and a check valve including a dynamically operative ceramic element within said bore, whereby oil may be forced radially inwardly through said bore and check valve, via dynamic mesh of said gear teeth with gear teeth of a second gear.

2. The bearing lubricator of claim 1 wherein the bore thereof is compound, having two radially in-line contiguous sections, the first of said sections being of larger diameter than the second, said first section terminating at the gear teeth and containing said check valve.

3. The bearing lubricator of claim 2 wherein the check valve comprises a ball valve housing and a ball, the housing including a ball valve seat in one end thereof, and ball valve retension means in the other, whereby said ball is contained in said housing.

4. The bearing lubricator of claim 3 wherein said ball valve retension means comprise at least one retension tang.

5. The bearing lubricator of claim 4 wherein said ball is ceramic.

6. In a transmission having a shaft, a drive gear at an end of said shaft, the gear including a bore extending radially from gear teeth thereon to a pocket bearing internally of said gear; a pocket bearing lubricator within said drive gear comprising said bore and a check valve including a dynamically operative ceramic element within said bore, whereby oil may be forced radially inwardly through said bore and check valve, via dynamic mesh of said gear teeth with gear teeth of a second gear.

7. The transmission of claim 6 wherein the bore thereof is compound, having two radially in-line contiguous sections, the first of said sections being of larger diameter than the second, said first section terminating at the gear teeth and containing said check valve.

8. The transmission of claim 7 wherein the check valve comprises a ball valve housing a ball, the housing including a ball valve seat in one end thereof, and ball valve retension means in the other, whereby said ball is contained in said housing.

9. The transmission of claim 8 wherein said ball valve retension means comprise at least one retension tang.

10. The transmission of claim 9 wherein said ball is ceramic.

* * * * *